(12) United States Patent
Huang et al.

(10) Patent No.: US 9,336,334 B2
(45) Date of Patent: May 10, 2016

(54) KEY-VALUE PAIRS DATA PROCESSING APPARATUS AND METHOD

(71) Applicant: BigObject, Inc., Grand Cayman (KY)

(72) Inventors: Yi-Cheng Huang, Taipei (TW);
Wenwey Hseush, Taipei (TW);
Yu-Chun Lai, Taipei (TW); Michael Chih Huong Fong, Taipei (TW)

(73) Assignee: BigObject, Inc., Grand Cayman (KY)

( * ) Notice: Subject to any disclaimer, the term of this patent is extended or adjusted under 35 U.S.C. 154(b) by 448 days.

(21) Appl. No.: 13/897,190

(22) Filed: May 17, 2013

(65) Prior Publication Data

US 2014/0344542 A1    Nov. 20, 2014

(51) Int. Cl.
*G06F 17/30*    (2006.01)

(52) U.S. Cl.
CPC ................................ *G06F 17/30997* (2013.01)

(58) Field of Classification Search
CPC ................................................. G06F 17/30997
See application file for complete search history.

(56) References Cited

U.S. PATENT DOCUMENTS

| | | | |
|---|---|---|---|
| 8,504,758 B1* | 8/2013 | McHugh | G06F 17/30117 707/638 |
| 2011/0013639 A1* | 1/2011 | Matthews | H04L 45/00 370/395.32 |
| 2011/0276744 A1* | 11/2011 | Sengupta | G06F 12/0866 711/103 |
| 2012/0036317 A1* | 2/2012 | Torii | G06F 17/30982 711/108 |
| 2012/0102298 A1* | 4/2012 | Sengupta | G06F 17/30312 711/216 |
| 2013/0042055 A1* | 2/2013 | Kinoshita | G06F 17/30587 711/103 |
| 2013/0238584 A1* | 9/2013 | Hendry | G06F 17/30619 707/706 |

* cited by examiner

*Primary Examiner* — Aracelis Ruiz
(74) *Attorney, Agent, or Firm* — Christensen Fonder P.A.

(57) ABSTRACT

Data processing apparatuses and data processing methods are provided. The data processing apparatus includes a storage unit, an interface, and a processor. The storage unit stores a first key-value set including a plurality of first key-value pairs. Each of the first key-value pairs has a first key and a first value. The interface receives an instruction regarding a set operation and a function. The processor generates a plurality of second keys by applying the set operation to the first keys. Each of the second keys includes at least one of the first keys. The processor generates a second value for each of the second keys by applying the function to at least one datum corresponding to the at least one first key comprised in the second key. Each second key and the corresponding second value form a second key-value pair and the second key-value pairs form a second key-value set.

18 Claims, 3 Drawing Sheets

KEY-VALUE PAIRS DATA PROCESSING APPARATUS AND METHOD

CROSS-REFERENCES TO RELATED APPLICATIONS

Not applicable.

BACKGROUND OF THE INVENTION

1. Field of the Invention

The present invention relates to data processing apparatus and method. More particularly, the present invention relates to data processing apparatus and method for key-value pairs.

2. Descriptions of the Related Art

The form of key-value pairs is commonly used for data representation and data storage in computing systems recently. Regarding a key-value pair, the "key" portion is a label/key, while the "value" portion is a value corresponding to the label/key. For example, configurations of a computer may be stored in key-value pairs and one of them may be ("RAM": 2 GB), which means that the RAM of the computer is of size 2 GB.

Although the form of key-value pairs provides flexibility for storing different kinds of information, users face the difficulties in processing the real data stored in key-value pairs. For example, when intending to perform a set operation, a user has to perform various queries at first and perform the desired set operations on the sets derived from the queries thereafter. Yet as another example, when intending to work on the values of key-value pairs, a user also has to perform various queries and/or set operations at first and work on the values of the result(s) of queries and/or set operations thereafter. It means that a user cannot work on the values of key-values set directly, not to mention performing a set operation and working on the values at the same time.

According to the above description, a data processing apparatus and method that can dealt with complicated queries and/or processes on key-value pairs is in an urgent need.

SUMMARY OF THE INVENTION

An objective of this invention is to provide a data processing apparatus, which comprises a storage unit, an interface, and a processor. The processor is electrically connected to the storage unit and the interface. The storage unit is stored with a first key-value set comprising a plurality of first key-value pairs, where in each of the first key-value pairs comprises a first key and a first value. The interface is configured to receive an instruction regarding a set operation and a function. The processor is configured to generate a plurality of second keys by applying the set operation to the first keys so that each of the second keys comprises at least one of the first keys. The processor is also configured to generate a second value for each of the second keys by applying the function to at least one datum corresponding to the at least one first key comprised in the second key. Each second key and the corresponding second value form a second key-value pair and the second key-value pairs form a second key-value set.

Another objective of this invention is to provide a data processing apparatus, which comprises a storage unit, an interface, and a processor. The processor is electrically connected to the storage unit and the interface. The storage unit is stored with a first key-value set and a second key-value set. The first key-value set comprises a plurality of first key-value pairs, wherein each of the first key-value pairs comprises a first key and a first value. The second key-value set comprises a plurality of second key-value pairs, wherein each of the second key-value pairs comprises a second key and a second value. The interface is configured to receive an instruction regarding a set operation and a function. The processor is configured to generate a plurality of third keys by applying the set operation to the first keys and the second keys, wherein the third key is equivalent to one of the first keys and the second keys. The processor is further configured to generate a third value for each of the third keys by applying the function to at least one of the first values and the second values corresponding to the third key. Each of the third keys and the corresponding third value form a third key-value pair and the third key-value pairs form a third key-value set.

A further objective of this invention is to provide a data processing method for use in a computer system. The computer system is stored with a first key-value set comprising a plurality of first key-value pairs, wherein each of the first key-value pairs comprises a first key and a first value. The data processing method comprises the following steps of (a) receiving an instruction regarding a set operation and a function, (b) generating a plurality of second keys by applying the set operation to the first keys so that each of the second keys comprises at least one of the first keys, and (c) generating a second value for each of the second keys by applying the function to at least one datum corresponding to the at least one first key comprised in the second key. It is noted that each second key and the corresponding second value form a second key-value pair and the second key-value pairs form a second key-value set.

Yet a further objective of this invention is to provide a data processing method for use in a computer system. The computer system is stored with a first key-value set and a second key-value set. The first key-value set comprises a plurality of first key-value pairs, wherein each of the first key-value pairs comprises a first key and a first value. The second key-value set comprises a plurality of second key-value pairs, wherein each of the second key-value pairs comprises a second key and a second value. The data processing method comprises the following steps of: (a) receiving an instruction regarding a set operation and a function, (b) generating a plurality of third keys by applying the set operation to the first keys and the second keys, wherein the third key is equivalent to one of the first keys and the second keys, and (c) generating a third value for each of the third keys by applying the function to at least one of the first values and the second values corresponding to the third key. It is noted that each of the third keys and the corresponding third value form a third key-value pair and the third key-value pairs form a third key-value set.

According to the above descriptions, given an instruction containing a set operation and a function, the data processing apparatuses and methods of the present invention are able to generate a new key-value set by applying the set operation to the keys of the designated key-value set(s) and by applying the function to the values of the designated key-value set(s). Hence, complicated queries and/or processes on key-value pairs can be easily achieved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, data processing apparatus and method of the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1:
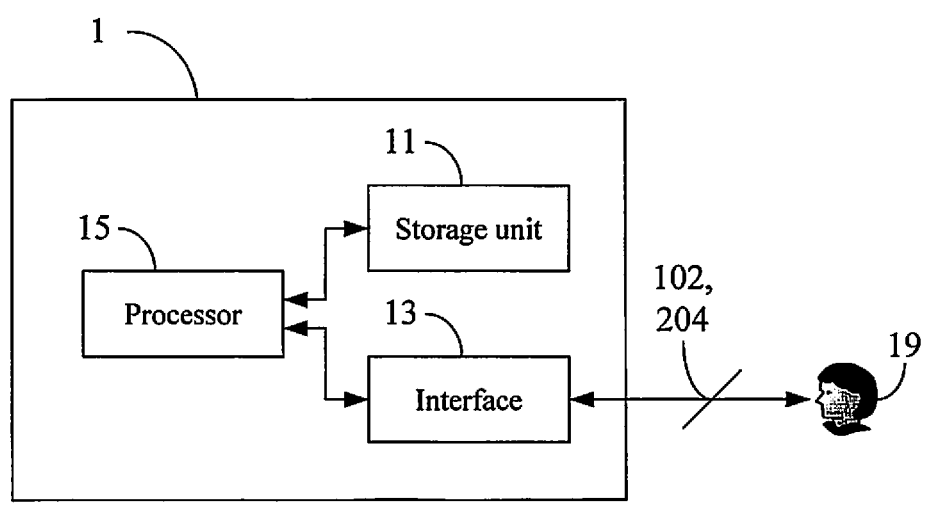
FIG. 1 illustrates the schematic view of the data processing apparatus 1 of the present invention.

FIG. 1 illustrates a schematic view of a data processing apparatus 1 of the present invention. The data processing apparatus 1 comprises a storage unit 11, an interface 13, and a processor 15, wherein the processor 15 is electrically connected to the storage unit 11 and the interface 13. The storage unit 11 may be a memory, a floppy disk, a hard disk, a compact disk (CD), a mobile disk, a magnetic tape, a database accessible to networks, or any other storage media with the same function and well-known to those of ordinary skill in the art or a circuit. The interface 13 may be any interface that can be controlled by a user and receive an instruction according to the control of the user. The processor 15 may be any of various processors, central processing units (CPUs), microprocessors, or other computing devices well known to those of ordinary skill in the art.

Please refer to FIG. 1 for the first embodiment of the present invention. In this embodiment, the storage unit 11 is stored with a first key-value set comprising a plurality of first key-value pairs, wherein each of the first key-value pairs comprises a first key and a first value. The interface 13 receives an instruction 102 regarding a set operation and a function from a user 19. In this embodiment, the set operation is a unary operation (i.e. the one that takes one single key-value set as input), while the function may be any of various kinds of operations, such as an arithmetic function or a user defined function. In case that the storage unit 11 is stored with more than one key-value set, the instruction 102 further regards a target set so that the processor 15 can retrieve the exact key-value set that the user 19 intends to operate on (e.g. the first key-value set) according to the target set indicated in the instruction 102.

After the instruction 102 is received by the interface 13, the processor 15 generates a plurality of second keys by applying the set operation indicated in the instruction 102 to the first keys so that each of the second keys comprises at least one of the first keys. For each of the second keys, the processor 15 generates a second value by applying the function indicated in the instruction 102 to at least one datum corresponding to the at least one first key comprised in the second key. Each second key and the corresponding second value form a second key-value pair and the second key-value pairs form a second key-value set.

Generally speaking, there are at least two types of approaches for generating the second values. Regarding the first type of the approaches, the aforementioned at least one datum used for generating each second value corresponds to one of the first key comprised in the second key. Regarding the second type of the approaches, the aforementioned at least one datum is related at least a datum comprised in an object. These two types of approaches for generating the second values will be elaborated below.

In the first type of approaches, the instruction 102 further regards a factor so that a size of each of the second keys is equivalent to the factor. For example, if the factor is two, the size of each of the second keys is equivalent to two. The processor generates the second value for each of the second keys by applying the function to the at least one first value corresponding to the at least one first key comprised in the second key. Several examples are given below.

When the set operation is a combination operation, the second keys are a plurality of combinations of the first keys. Specifically, when the factor indicated in the instruction 102 is two, the second key-value set generated by the processor 15 may be denoted by $$S_2 = C2_\oplus(S_1) = \{(k{:}v) | k=(k_1,k_2), k_1 < k_2, (k_1{:}v_1) \in S_1, (k_2{:}v_2) \in S_1, v = \oplus(k_1{:}v_1, k_2{:}v_2)\}.$$

In the above equation, the parameters $S_1$ and $S_2$ respectively represent the first key-value set and the second key-value set. The function $C2_\oplus(\cdot)$ represents the set operation is combination, the factor is two, and the notation $\oplus$ indicates the function. The parameters $k_1$ and $k_2$ represent the first keys, the parameters $v_1$ and $v_2$ represent the first value, and the parameters $(k_1{:}v_1)$ and $(k_2{:}v_2)$ represents first key-value pairs. In addition, the parameter k represent the second key, the parameter v represent the second value, and the parameter (k:v) represents second key-value pairs. For example, if $S_1=\{(a{:}1),(b{:}3),(c{:}5)\}$ and $\oplus=\text{SUM}(k_1{:}v_1,k_2{:}v_2)=v_1+v_2$, then $S_2=C2_\oplus(S_1)=\{((a,b){:}4),((a,c){:}6),((b,c){:}8)\}$.

When the set operation is a combination operation and the factor indicated in the instruction 102 is n, the second key-value set generated by the processor 15 may be denoted by the following equation:

$$S_2 = Cn_\oplus(S_1) = \{(k{:}v) | k=(k_1,k_2,\ldots,k_n), k_1<k_2<\ldots<k_n, (k_1{:}v_1)\in S_1,(k_2{:}v_2)\in S_1,\ldots,(k_n{:}v_n)\in S_1, v=\oplus(k_1{:}v_1, k_2{:}v_2,\ldots,k_n{:}v_n)\}.$$

In the above equation, the parameter n is a positive integer that is greater than two. The function $Cn_\oplus(\cdot)$ represents the set operation is combination, the factor is n, and the notation $\oplus$ indicates the function. The parameters $S_1$ and $S_2$ respectively represent the first key-value set and the second key-value set. The parameters $k_1$, $k_2$, and $k_n$ represent the first keys, the parameters $v_1$, $v_2$, and $v_n$ represent the first value, and the parameters $(k_1{:}v_1)$, $(k_2{:}v_2)$, and $(k_n{:}v_n)$ represents first key-value pairs. In addition, the parameter k represent the second key, the parameter v represent the second value, and the parameter (k:v) represents second key-value pairs.

When the set operation is a permutation operation, the second keys are a plurality of permutations of the first keys. Specifically, when the factor indicated in the instruction 102 is two, the second key-value set generated by the processor 15 may be denoted by $$S_2 = P2_\oplus(S_1) = \{(k{:}v) | k=(k_1,k_2), k_1 \neq k_2, (k_1{:}v_1) \in S_1, (k_2{:}v_2) \in S_1, v=\oplus(k_1{:}v_1, k_2{:}v_2)\}.$$

In the above equation, the parameters $S_1$ and $S_2$ respectively represent the first key-value set and the second key-value set. The function $P2_\oplus(\cdot)$ represents the set operation is permutation, the factor is two, and the notation $\oplus$ indicates the function. The parameters $k_1$ and $k_2$ represent the first keys, the parameters $v_1$ and $v_2$ represent the first value, and the parameters $(k_1{:}v_1)$ and $(k_2{:}v_2)$ represents first key-value pairs. In addition, the parameter k represent the second key, the parameter v represent the second value, and the parameter (k:v) represents second key-value pairs. For example, if $S_1=\{$ (a:1),(b:3),(c:5)} and $\oplus$=SUM($k_1$:$v_1$,$k_2$:$v_2$)=$v_1$+$v_2$, then $S_2$=P2$_\oplus$($S_1$)={((a,b):4),((a,c):6),((b,c):8),((b,a):4),((c,a):6),((c,b):8)}.

When the set operation is a permutation operation and the factor indicated in the instruction 102 is n, the second key-value set generated by the processor 15 may be denoted by the following equation:

$$S_2=Pn_\oplus(S_1)=\{(k:v)|k=(k_1,k_2,\ldots,k_n),k_1\neq k_2\neq\ldots\neq k_n,$$
$$(k_1:v_1)\in S_1,(k_2:v_2)\in S_1,\ldots,(k_n:v_n)\in S_1,v=\oplus(k_1:v_1,k_2:v_2,\ldots,k_n:v_n)\}.$$

In the above equation, the parameter n is a positive integer that is greater than two. The function $Pn_\oplus(\cdot)$ represents the set operation is permutation, the factor is n, and the notation $\oplus$ indicates the function. The parameters $S_1$ and $S_2$ respectively represent the first key-value set and the second key-value set. The parameters $k_1$, $k_2$, and $k_n$ represent the first keys, the parameters $v_1$, $v_2$, and $v_n$ represent the first value, and the parameters ($k_1$:$v_1$), ($k_2$:$v_2$), and ($k_n$:$v_n$) represents first key-value pairs. In addition, the parameter k represent the second key, the parameter v represent the second value, and the parameter (k:v) represents second key-value pairs.

Next, the second type of approaches for generating the second values is described below. In this case, the storage unit 11 is further stored with an object, wherein the object comprises a plurality of object data. The object may be a file(s), an image(s), a matrix, etc. For example, when the object is a matrix, the object data are the elements of the matrix. The processor 15 generate a second value for each of the second keys by applying the function to one of the object data that is related to all of the at least one first key comprised in the second key.

A concrete example is given here. It is assumed that $S_1$={(a:1),(b:3),(c:5)}, wherein $S_1$ represents the first key-value set, the parameters a, b, and c represent the first keys, and the values 1, 3 and 5 are the first values. It is also assumed that the object stored in the storage unit 11 is a matrix with the content M(a,b)=0, M(a,c)=2, and M(b,c)=3, wherein the function M($\cdot$) indicates the content of the matrix. Moreover, the function $\oplus$($k_1$:$v_1$,$k_2$:$v_2$) is defined as increasing M($k_1$,$k_2$) by one. Base on the assumptions, the resultant second key-value set is $S_2$=C2$\oplus$($S_1$)={((a,b):1),((a,c):3),((b,c):4)}. It means that the content of the matrix will become M(a,b)=1, M(a,c)=3, and M(b,c)=4.

According to the above descriptions, given an instruction containing a set operation, a function, and a target set, the data processing apparatus 1 will generate a new key-value set by applying the set operation to the keys of the target key-value set and by applying the function to the values of the target key-value set.

Please also refer to FIG. 1 for the second embodiment of the present invention. In this embodiment, the storage unit 11 is stored with a first key-value set and a second key-value set. The first key-value set comprises a plurality of first key-value pairs, wherein each of the first key-value pairs comprises a first key and a first value. The second key-value set comprises a plurality of second key-value pairs, wherein each of the second key-value pairs comprises a second key and a second value.

The interface 13 receives an instruction 204 regarding a set operation and a function inputted by the user 19. In this embodiment, the set operation is a binary operation (e.g. an intersection operation, a union operation, a difference operation, a symmetric difference operation, and etc.) that takes two key-value sets as input, while the function may be any of various kinds of operations, such as an arithmetic function or a user defined function. In case that the storage unit 11 is stored with more than two key-value set, the instruction 204 further regards a first target set and a second target set so that the processor 15 can retrieve the exact key-value sets that the user 19 intends to operate on (e.g. the first key-value set and the second key-value set) according to the first and second target sets indicated in the instruction 102.

After the instruction 102 is received by the interface 13, the processor 15 generates a plurality of third keys by applying the set operation to the first keys and the second keys, wherein the third key is equivalent to one of the first keys and the second keys. For each of the third keys, the processor 15 further generates a third value by applying the function to at least one of the first values and the second values corresponding to the third key. It is noted that each of the third keys and the corresponding third value form a third key-value pair and the third key-value pairs form a third key-value set.

When the set operation is the intersection operation, the third key-value set generated by the processor 15 may be denoted by the following equation:

$$S_3=S_1\cap_\oplus S_2=\{(k:v)|(k_1:v_1)\in S_1,(k_2:v_2)\in S_2,k=k_1=k_2,v=\oplus(k_1:v_1,k_2:v_2)\},$$

wherein the parameters $S_1$, $S_2$, and $S_3$ respectively represent the first key-value set, the second key-value set, and the third key-value set. The notation $\cap_\oplus$ represents the set operation is intersection operation and the notation $\oplus$ indicates the function. The parameters $k_1$ and $k_2$ respectively represent the first key and the second key, while the parameters $v_1$ and $v_2$ respectively represent the first value and the second value. The parameter k represent s the third key, the parameter v represents the third value, and the parameters (k:v) represents third key-value pairs. For example, if $S_1$={(a:1),(b:3),(c:5)} and $\oplus$=SUM($k_1$:$v_1$,$k_2$:$v_2$)=$v_1$+$v_2$, then $S_3$=$S_1\cap_\oplus S_2$={(a:3),(b:6)}.

When the set operation is the union operation, the third key-value set generated by the processor 15 may be denoted by the following equation:

$$S_3=S_1\cup_\oplus S_2=\{(k:v)|(k:v)\in(S_1-_\oplus S_2)$$

or $$(k:v)\in(S_2-_\oplus S_1)$$

or $$(k:v)\in(S_1\cap_\oplus S_2)\},$$

wherein the parameters $S_1$, $S_2$, and $S_3$ respectively represent the first key-value set, the second key-value set, and the third key-value set. The notation $\cup_\oplus$ represents the set operation is union operation and the notation $\oplus$ indicates the function. The parameter k represents the third key, the parameter v represents the third value, and the parameters (k:v) represents third key-value pairs. In addition, the notation $-_\oplus$ represents the difference operation. For example, if $S_1$={(a:1),(b:3),(c:5)} and $\oplus$=SUM($k_1$:$v_1$,$k_2$:$v_2$)=$v_1$+$v_2$, then $S_3$=$S_1\cap_\oplus S_2$={(a:3),(b:6),(c:5),(d:4)}.

When the set operation is the difference operation, the third key-value set generated by the processor 15 may be denoted by the following equation:

$$S_3=S_1-_\oplus S_2=\{(k:v)|(k:v)\in S_1,(k:v)\notin S_2,v=\oplus(k:v,\text{NULL})\},$$

wherein the parameters $S_1$, $S_2$, and $S_3$ respectively represent the first key-value set, the second key-value set, and the third key-value set. The parameter v represents the first value. The notation $-_\oplus$ represents the set operation is difference operation and the notation $\oplus$ indicates the function. The parameter k represents the third key, the parameter v represents the third value, and the parameters (k:v) represents third key-value pairs. For example, if $S_1=\{(a:1),(b:3),(c:5)\}$ and $\oplus=$SUM$(k_1:v_1,k_2:v_2)=v_1+v_2$, then $S_3=S_1-_{\oplus}S_2=\{(c:5)\}$.

When the set operation is the symmetric difference operation, the third key-value set generated by the processor 15 may be denoted by the following equation:

$$S_3=S_1\ominus_{\oplus}S_2=\{(k:v)|(k:v)\epsilon(S_1-_{\oplus}S_2)$$

or $$(k:v)\epsilon(S_2-_{\oplus}S_1)\},$$

wherein the parameters $S_1$, $S_2$, and $S_3$ respectively represent the first key-value set, the second key-value set, and the third key-value set. The notation $\ominus_{\oplus}$ represents the set operation is symmetric difference operation and the notation $\oplus$ indicates the function. The parameter k represents the third key, the parameter v represents the third value, and the parameters (k:v) represents third key-value pairs. For example, if $S_1=\{(a:1),(b:3),(c:5)\}$ and $\oplus=$SUM$(k_1:v_1,k_2:v_2)=v_1+v_2$, then $S_3=S_1\ominus_{\oplus}S_2=\{(c:5),(d:4)\}$.

According to the above descriptions, given an instruction containing a set operation, a function, a first target set, and a second target set, the data processing apparatus 1 of the second embodiment will generate a new key-value set by applying the set operation to the keys of the first and second target key-value sets and by applying the function to the values of the first and second target key-value sets.

Figure 2:
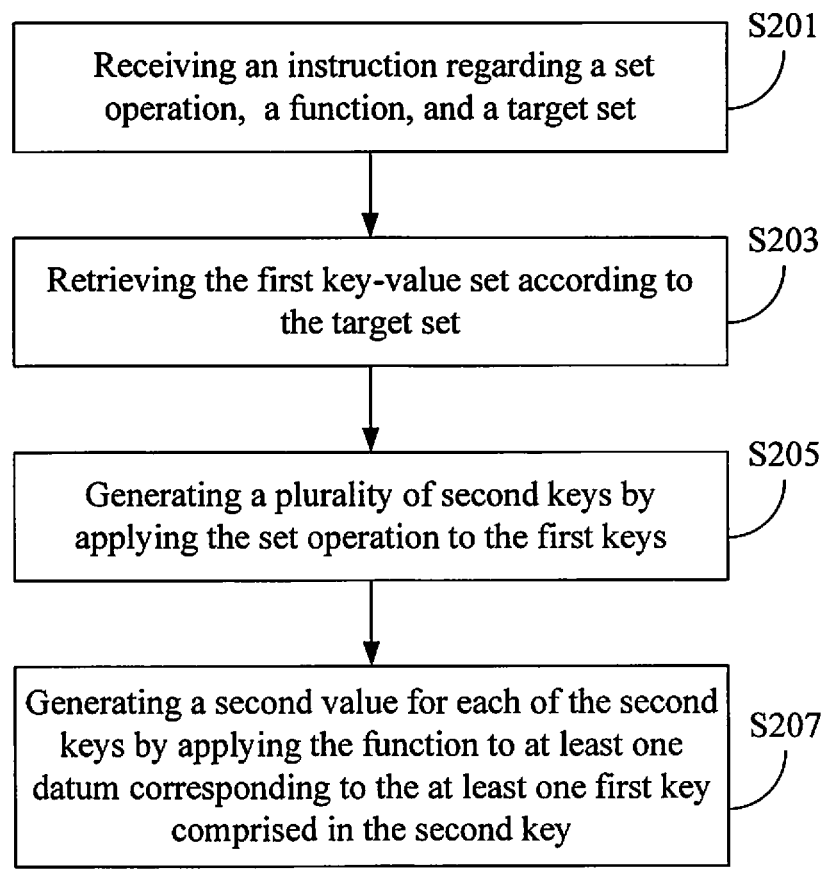
FIG. 2 illustrates the flowchart of the third embodiment of the present invention.

A third embodiment is a data processing method for use in a computer system (e.g. the aforementioned data processing apparatus 1), whose flowchart is illustrated in FIG. 2. The computer system is stored a plurality of key-value sets, wherein one them is a first key-value set. The first key-value set comprises a plurality of first key-value pairs, wherein each of the first key-value pairs comprises a first key and a first value.

First, the data processing method executes step S201 for receiving an instruction by the computer system, wherein the instruction regards a set operation, a function, and a target set. Next, step S203 is executed for retrieving the first key-value set according to the target set by the computer system. In case that the computer system is stored with only one key-value set (i.e. the first key-value set), the target set may be omitted from the content of the instruction received in step S201.

Following that, step S205 is executed for generating a plurality of second keys by applying the set operation to the first keys by the computer system, wherein each of the second keys comprises at least one of the first keys. Afterwards, step S207 is executed by the computer system for generating a second value for each of the second keys by applying the function to at least one datum corresponding to the at least one first key comprised in the second key. It is noted that each second key and the corresponding second value form a second key-value pair and the second key-value pairs form a second key-value set. Several examples of steps S203, S205, and S207 are given below.

For example, the instruction received in step S203 further regards a factor and the set operation indicated in the instruction received in step S203 is a combination operation or a permutation operation. When the set operation is a combination operation, the second keys generated by the step S205 are a plurality of combinations of the first keys and the size of each of the second keys is equivalent to the factor. Likewise, when the set operation is a permutation operation, the second keys generated by the step S205 are a plurality of permutations of the first keys and the size of each of the second keys is equivalent to the factor. Then, step S207 generates the second value for each of the second keys by applying the function to the at least one first value corresponding to the at least one first key comprised in the second key.

In another example, the computer system is further stored with an object, wherein the object comprises a plurality of object data. The step S207 is executed by the computer system for generating a second value for each of the second keys by applying the function to one of the object data that is a value related to all of the at least one first key comprised in the second key.

In addition to the aforesaid steps, the third embodiment can execute all the operations set forth for the first embodiment. How the third embodiment executes these operations will be readily appreciated by those of ordinary skill in the art based on the explanation of the first embodiment and thus will not be further described therein.

Figure 3:
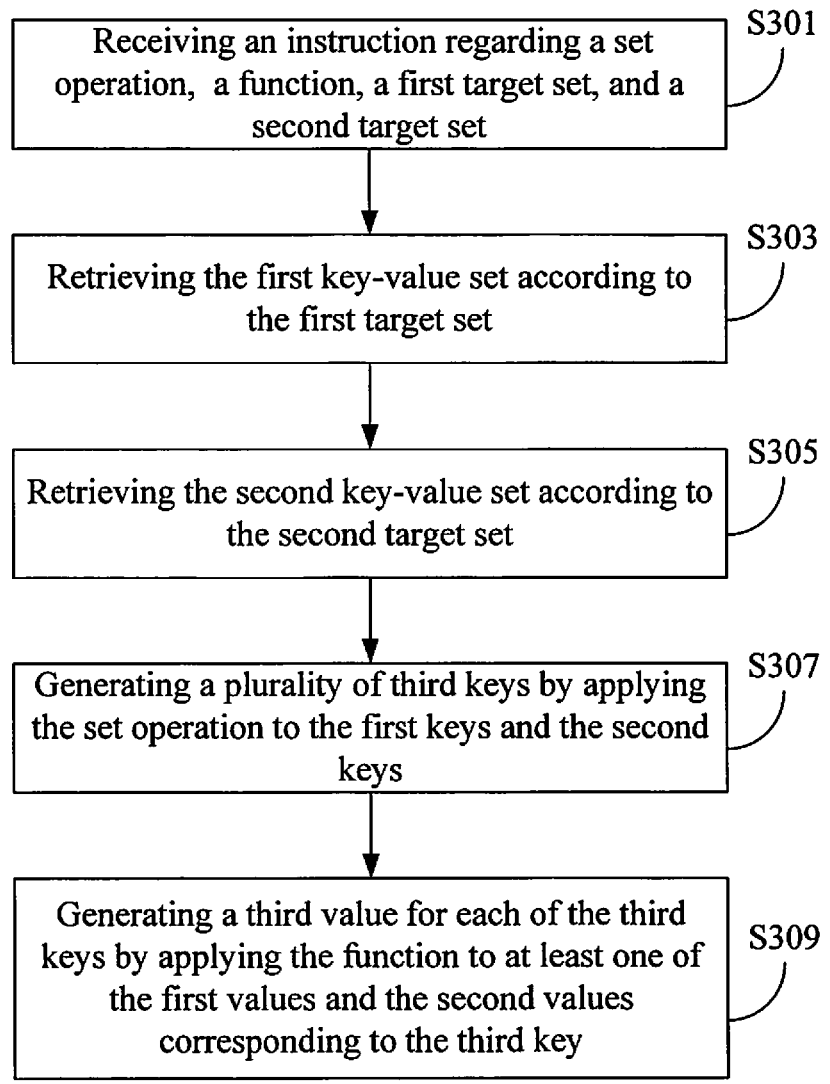
FIG. 3 illustrates the flowchart of the fourth embodiment of the present invention.

A fourth embodiment is a data processing method for use in a computer system (e.g. the aforementioned data processing apparatus 1), whose flowchart is illustrated in FIG. 3. The computer system is stored with a plurality of key-value sets including a first key-value set and a second key-value set. The first key-value set comprises a plurality of first key-value pairs, wherein each of the first key-value pairs comprises a first key and a first value. The second key-value set comprises a plurality of second key-value pairs, wherein each of the second key-value pairs comprises a second key and a second value.

First, the data processing method executes step S301 for receiving an instruction by the computer system, wherein the instruction regards a set operation, a function, a first target set, and a second target set. The set operation may be an intersection operation, a union operation, a difference operation, a symmetric difference operation, or other operations based on two key-value sets.

Next, step S303 is executed by the computer system for retrieving the first key-value set according to the first target set and step S305 is executed by the computer system for retrieving the second key-value set according to the second target set. In some embodiments, the step S305 may be executed before the step S303 or both of them can be executed at the same time. In case that the computer system is stored with only one key-value set (i.e. the first key-value set), the first target set and the second target set may be omitted from the content of the instruction received in step S301.

Following that, step S307 is executed by the computer system for generating a plurality of third keys by applying the set operation to the first keys and the second keys, wherein the third key is equivalent to one of the first keys and the second keys. Next, step S309 is executed by the computer system for generating a third value for each of the third keys by applying the function to at least one of the first values and the second values corresponding to the third key. It is noted that each of the third keys and the corresponding third value form a third key-value pair and the third key-value pairs form a third key-value set.

In addition to the aforesaid steps, the fourth embodiment can execute all the operations set forth for the second embodiment. How the fourth embodiment executes these operations will be readily appreciated by those of ordinary skill in the art based on the explanation of the second embodiment and thus will not be further described therein.

According to the above descriptions, given an instruction containing a set operation and a function, the data processing apparatuses and methods of the present invention are able to generate a new key-value set by applying the set operation to the keys of the designated key-value set(s) and by applying the function to the values of the designated key-value set(s). Hence, complicated queries and/or processes on key-value pairs can be easily achieved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data processing apparatus, comprising:
    a storage unit, being stored with a first key-value set comprising a plurality of first key-value pairs, each of the first key-value pairs comprising a first key and a first value;
    an interface, being configured to receive an instruction regarding a set operation, a function, and a factor; and
    a processor, being electrically connected to the storage unit and the interface and configured to generate a plurality of second keys by applying the set operation to the first keys so that each of the second keys comprises at least one of the first keys and generate a second value for each of the second keys by applying the function to at least one datum corresponding to the at least one first key comprised in the second key,
    wherein a size of each of the second keys is equivalent to the factor, each second key and the corresponding second value form a second key-value pair and the second key-value pairs form a second key-value set.

2. The data processing apparatus of claim 1, wherein the instruction further regards a target set and the processor further retrieves the first key-value set according to the target set.

3. The data processing apparatus of claim 1, wherein each of the at least one datum is the first value corresponding to one of the first key comprised in the second key and the processor generates the second value for each of the second keys by applying the function to the at least one first value corresponding to the at least one first key comprised in the second key.

4. The data processing apparatus of claim 1, wherein the storage unit is further stored with an object, the object comprises a plurality of object data, the at least one datum is one of the object data, and the at least one datum is related to all of the at least one first key comprised in the second key.

5. The data processing apparatus of claim 1, wherein the set operation is a combination operation and the second keys are a plurality of combinations of the first keys.

6. The data processing apparatus of claim 1, wherein the set operation is a permutation operation and the second keys are a plurality of permutations of the first keys.

7. A data processing apparatus, comprising:
    a storage unit, being stored with a first key-value set and a second key-value set, the first key-value set comprising a plurality of first key-value pairs, each of the first key-value pairs comprising a first key and a first value, the second key-value set comprising a plurality of second key-value pairs, and each of the second key-value pairs comprising a second key and a second value;
    an interface, being configured to receive an instruction regarding a set operation and a function; and
    a processor, being electrically connected to the storage unit and the interface and configured to generate a plurality of third keys by applying the set operation to the first keys and the second keys, wherein the third key is equivalent to one of the first keys and the second keys,
    where in the processor is further configured to generate a third value for each of the third keys by applying the function to at least one of the first values and the second values corresponding to the third key,
    wherein each of the third keys and the corresponding third value form a third key-value pair and the third key-value pairs form a third key-value set.

8. The data processing apparatus of claim 7, wherein the instruction further regards a first target set and a second target set and the processor further retrieves the first key-value set and the second key-value set according to the first target set and the second target set respectively.

9. The data processing apparatus of claim 7, wherein the set operation is one of an intersection operation, a union operation, a difference operation, and a symmetric difference operation.

10. A data processing method for use in a computer system, the computer system being stored with a first key-value set comprising a plurality of first key-value pairs, each of the first key-value pairs comprising a first key and a first value, the data processing method comprising the following steps of:
    (a) receiving an instruction regarding a set operation, a function, and a factor;
    (b) generating a plurality of second keys by applying the set operation to the first keys so that each of the second keys comprises at least one of the first keys, wherein a size of each of the second keys is equivalent to the factor; and
    (c) generating a second value for each of the second keys by applying the function to at least one datum corresponding to the at least one first key comprised in the second key,
    wherein each second key and the corresponding second value form a second key-value pair and the second key-value pairs form a second key-value set.

11. The data processing method of claim 10, wherein the instruction further regards a target set and the data processing method further comprises the following step of
    retrieving the first key-value set according to the target set.

12. The data processing method of claim 10, wherein each of the at least one datum is the first value corresponding to one of the first key comprised in the second key and the step (c) generates the second value for each of the second keys by applying the function to the at least one first value corresponding to the at least one first key comprised in the second key.

13. The data processing method of claim 10, wherein the computer system is further stored with an object, the object comprises a plurality of object data, the at least one datum is one of the object data, and the at least one datum is a value related to all of the at least one first key comprised in the second key.

14. The data processing method of claim 10, wherein the set operation is a combination operation and the second keys are a plurality of combinations of the first keys.

15. The data processing method of claim 10, wherein the set operation is a permutation operation and the second keys are a plurality of permutations of the first keys.

16. A data processing method for use in a computer system, the computer system being stored with a first key-value set and a second key-value set, the first key-value set comprising a plurality of first key-value pairs, each of the first key-value pairs comprising a first key and a first value, the second key-value set comprising a plurality of second key-value pairs, each of the second key-value pairs comprising a second key and a second value, and the data processing method comprising the following steps of:

receiving an instruction regarding a set operation and a function;

generating a plurality of third keys by applying the set operation to the first keys and the second keys, wherein the third key is equivalent to one of the first keys and the second keys; and generating a third value for each of the third keys by applying the function to at least one of the first values and the second values corresponding to the third key, wherein each of the third keys and the corresponding third value form a third key-value pair and the third key-value pairs form a third key-value set.

17. The data processing method of claim 16, wherein the instruction further regards a first target set and a second target set and the data processing method further comprises the following steps of:

retrieving the first key-value set according to the first target set; and retrieving the second key-value set according to the second target set.

18. The data processing method of claim 16, wherein the set operation is one of an intersection operation, a union operation, a difference operation, and a symmetric difference operation.

\* \* \* \* \*